United States Patent Office 3,367,703
Patented Feb. 6, 1968

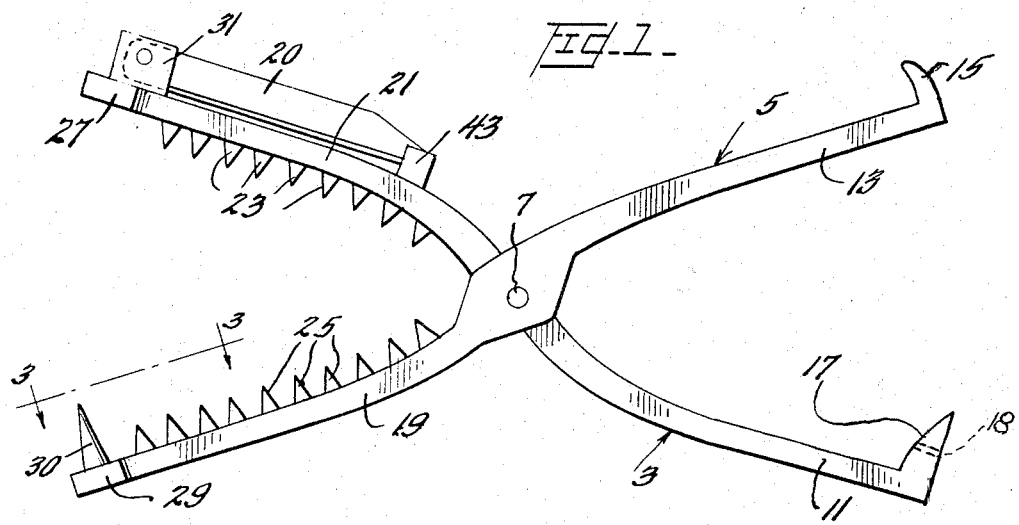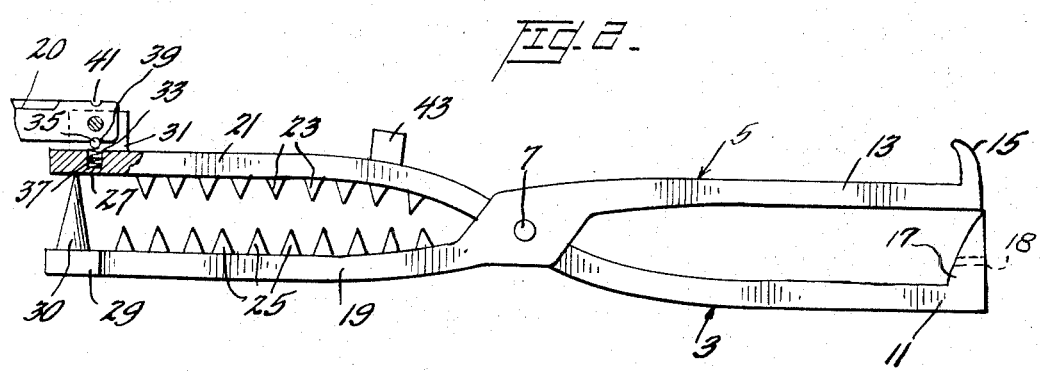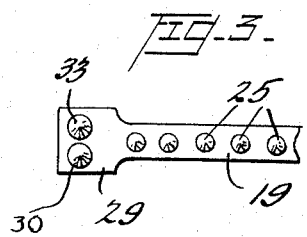

3,367,703
FISHERMAN'S TOOL
Harry Pittis, 3706 Harrison St. NW.,
Washington, D.C. 20015
Filed May 9, 1967, Ser. No. 637,137
1 Claim. (Cl. 294—16)

ABSTRACT OF THE DISCLOSURE

The invention relates to a plier type of toothed gripping tool for holding fish, crabs and the like while removing hooks, cleaning, etc., and is distinguished by the jaw shape and tooth position.

---

This invention is directed to a fish, etc., gripping device so configured and dimensioned as to enable convenient use and further, storage in a typical tackle box. More particularly, the invention is directed to a plier type of tool and is an improvement over such similar tools as illustrated in U.S. Patents 3,046,596, 1,949,452 and 2,785,-436, among other similar patents.

It is known to provide plier type of gripping tools for holding fish, crabs and the like as clearly evidenced by the patents referred to above. However, these devices have not met with any degree of general use. Experience has shown that such devices as presently constituted are cumbersome, do not provide for use in a variety of situations, are harmful to the animal, if, for example, it is desired to unhook and return same to the water, or are harmful to the meat of the carcass when the species caught is of an edible variety and must be cleaned prior to being cooked.

The present invention, then, has for an object the provision of a conveniently useable fish holding tool.

Another object of the invention is to provide for a fisherman's tool having a unique tooth arrangement enabling its use in a variety of operations upon the caught species.

Still a further object of the invention is to produce an easily handled, conveniently stored fish holding tool.

An additional object of the invention is to provide a plier type of fish, or the like, gripping tool having a unique jaw and tooth arrangement enabling its use for a variety of operations requiring the animal or its carcass to be firmly held.

These and other objects of the invention not specifically set forth herein but apparent to those skilled in the art may be attained by a tool comprising a pair of lever members pivotally interconnected intermediate their ends for movement toward and away from one another; the portion of the lever members disposed on one side of the pivotal interconnection defining manually operable handles, one of which is provided with a loop element disposed on its inner surface, said loop element being in abutment with the inner surface of the other handle member when the handles are moved toward one another; the portion of the lever members on the opposite side of the pivotal interconnection defining the fish gripping portion of said tool, each of said gripping portions being bowed outwardly from said point of pivotal interconnection and including a widened terminal end area, the inner surfaces of the bowed portions being provided with opposed rows of cone shaped teeth, lying in a common plane passing through said gripping portions, the enlarged terminal end area of one of said lever members being provided with a pair of prong members, the same area of the other member being moved into abutment with said prong members when the tool is closed.

Preferably the outer side of one of the gripping portions of said lever members is provided with a knife blade pivoted thereon for folding to a closed position against the member and movable to an open position extending beyond the terminal end thereof and means for retaining said blade in either of its two positions selectively.

Having described my invention in its broadest aspects, consideration will be given to a detailed description thereof, attention being invited to the drawing, wherein FIGURE 1 is a side elevation of the tool in open position, FIGURE 2 is a partial view showing the gripping members in closed position and the knife blade extended.

FIGURE 3 is a partial view taken along the line 3—3 of FIGURE 1.

Turning to FIG. 1, it may be seen that the tool is of a generally plier type configuration having two lever members 3 and 5 pivotally interconnected at their proximate mid-point by any suitable fastening means 7. Preferably the fastening means comprises a nut and bolt.

As shown, that part of each lever member to the right of the pivot point is shaped to form cooperating handles 11 and 13, respectively. Handle 13 is provided, adjacent its end with an outwardly extending projection 15, preferably curved to comfortably fit the edge of the palm of the hand, while the handle 11 is provided with an inwardly extending stop member 17. The projection 15 prevents the handles from slipping from the hand of a user, while stop member 17 also provided with aperture 18 provides a means receiving a cord or line to enable the user to fasten the tool to his person. The stop member 17 also cooperates with the inner surface of handle 13 to limit the degree of motion of the handles to a closed position.

That portion of each of the pivotally interconnected lever members to the left of the pivot point defines the working or gripping portion of the tool. As shown, the working portion of the lever members is bowed or arched outwardly from the pivot point toward their respective terminal ends 19 and 21. The opposing inner surfaces of the bowed portion of each lever member are in turn provided with cone shaped toothed elements 23 and 25. It will be noted that these elements all are arranged in a straight line such that they may be said to lie in a common plane extending through each lever member. Preferably, the toothed elements 23 are staggered with respect to the toothed elements 25 so that none of these elements are in point to point opposed relationship but rather the elements 23 may be said to be interdigitated with respect to elements 25, though, as will be seen these elements never approach each other to that degree.

As also shown, the gripping portions of the lever members are relatively slender in configuration throughout their length. However, the terminal ends of each are broadened out or widened so that these end areas 27 and 29 respectively are of a width approximately twice that of the members throughout the remainder of their length. The inner surface of one of the broad flattened end areas, in this case 29, is provided with a pair of prongs 30, 33 of substantially greater length than tooth elements 23, 25, while the inner surface of other end areas 27 is uninterrupted presenting a flat anvil against which the points of prongs 30, 33 abut when the lever members are moved to a closed position. It should be noted that prongs 30, 33 are spaced to either side of the common plane in which tooth elements 23 and 25 are disposed. In some cases, one of the prongs could be disposed on member 27 in which event half of the end areas would form an anvil. The preferred arrangement is, however, as shown in FIGURE 3 with both prongs 30 and 33 carried by the one member 29.

It should also be noted that when prongs 30, 33 abut the anvil surface of end 25 of lever member 11, the loop member 17 also abuts the inner surface of the handle portion of lever 13.

As shown in FIG. 2, when the lever members are closed, there is defined a space between tooth elements 23 and 25, which space is generally contoured to the cross-sectional configuration of a fish or similar species on which the tool will be used. The purpose of this arrangement will become apparent hereinafter.

In order to make the tool completely versatile as an all purpose device, one of the lever members, in this case 27, is provided with a folding knife blade 20 on its back or outer side. This knife blade is mounted in a pivot block 31 having an aperture 33 in which is disposed a spring pressed detent comprising ball 35 and spring 37. The pivoted end of the blade include notches 39 and 41 which cooperate with the detent to retain the blade in open or closed position. When closed, the tip or point of the blade is seated, for safety, within a saddle block 43 also disposed on the outside of the gripping portion of the lever member.

In respect of dimensions, it has been found that the length of the lever arms 19 and 21 should be on the order of eleven inches while the maximum opening for the lever arms should be about five and one-half inches as measured from tip to tip at the gripping ends thereof. This sizing provides for convenient storage of the tool in almost any standard size tackle box and also permits handling of virtually any size catch for which the average fisherman pits his skill.

In use the tool is used primarily to hold a catch when first caught to enable removal of the hook by grasping the catch transverse of its body. Due to the spacing provided between teeth 23 and 25 the catch may be held with a minimum damage to its flesh while being unhooked. This same mode of use is followed where the catch is to be held solely for cleaning purposes in most cases.

Where, because of the dangerous nature of the catch, it is necessary to hold same quite firmly and/or where used as described would interfere with cleaning, the prongs 31 and 33 may be used to grasp and penetrate a specific area of the catch such as tail or head to further facilitate the operation being undertaken.

The uses for the knife are obvious, de-gutting, bait cutting, etc., all familiar to the fisherman.

Having thus described my invention in detail, it will be apparent that changes therein will occur to those skilled in the art and fall within the spirit and scope of the invention which is defined in the claim wherein what is claimed is:

1. A fisherman's catch holding tool comprising a pair of plier type lever members pivotally interconnected intermediate their ends for movement toward and away from each other, each of said members including a manually manipulatable handle portion disposed on one side of said interconnection point one of said handle members including an outwardly projecting lug, each of said members including an outwardly bowed gripping portion disposed on the opposite side of said interconnection point; a series of cone shaped teeth disposed on the inner surface of each of said outwardly bowed portions of said lever members, said teeth being in opposed interdigitated relation and lying in a common plane extending through the longitudinal axis of said members; each of said lever members terminating in enlarged terminal end areas, at least a portion of one of said areas defining a supporting base; a pair of prong members of substantially greater length than the length of said cone shaped teeth supported on said terminal end members and symmetrically disposed to either side of the common plane, said prong members being of a length such that when the lever members are closed and the prongs touch the opposed anvil portion of a terminal end area, the cone shaped teeth are spaced apart.

References Cited

UNITED STATES PATENTS

| | | | |
|---|---|---|---|
| 2,335,580 | 11/1943 | N. Chirelstein | 81—5 |
| 2,653,844 | 9/1953 | M. L. Detwiler | 294—118 |

FOREIGN PATENTS

| | | |
|---|---|---|
| 18,856 | 1/1905 | Sweden. |

ANDRES H. NIELSEN, *Primary Examiner.*

EVON C. BLUNK, *Examiner.*

R. D. GUIOD, *Assistant Examiner.*